United States Patent [19]

Iizuka

[11] Patent Number: 4,898,059

[45] Date of Patent: Feb. 6, 1990

[54] ELECTRONIC MUSICAL INSTRUMENT WHICH COMPARES AMOUNT OF DATA RECORDED IN INTERNAL MEMORY DEVICE WITH STORAGE CAPACITY OF EXTERNAL MEMORY DEVICE AND SELECTIVELY TRANSFERS DATA THERETO

[75] Inventor: Akira Iizuka, Hamamatsu, Japan

[73] Assignee: Yamaha Corporation, Hamamatsu, Japan

[21] Appl. No.: 153,226

[22] Filed: Feb. 8, 1988

[30] Foreign Application Priority Data

Feb. 6, 1987 [JP] Japan .................................. 62-25886
Feb. 6, 1987 [JP] Japan .................................. 62-25887

[51] Int. Cl.[4] ............................ G09B 15/; G10H 1/00

[52] U.S. Cl. ........................................ 84/601; 84/478; 340/384 E; 340/815.1

[58] Field of Search ....................... 84/1.01, 1.03, 1.28, 84/477 R, 478; 340/384 E, 756, 766, 782, 790, 815.01, 815.1; 364/200 MS File, 900 MS File; 360/91, 98.01, 99.01

[56] References Cited

U.S. PATENT DOCUMENTS 3,854,660 12/1974 Henegar ............................ 360/91 X
3,946,160 3/1976 Ando ................................ 360/91 X
4,040,027 8/1977 van Es et al. ........................ 364/900
4,206,483 6/1980 Nakamura ........................ 360/137 X
4,326,441 4/1982 Imamura et al. ......... 84/DIG. 12 X
4,377,852 3/1983 Thompson ........................... 364/900
4,413,328 11/1983 Videki, II ......................... 360/91 X
4,452,119 6/1984 Tanimoto ......................... 84/1.01 X
4,614,983 9/1986 Usami .............................. 84/1.01 X
4,615,024 9/1986 Usui ................................. 84/1.28 X
4,768,112 8/1988 Kido ................................. 360/91 X

*Primary Examiner*—Stanley J. Witkowski
*Attorney, Agent, or Firm*—Spensley Horn Jubas & Lubitz

[57] ABSTRACT

The electronic musical instrument provides an internal memory for storing performance data corresponding to a musical performance played by using a keyboard thereof and an external memory which can be freely attached to and detached from the main body thereof. The performance data stored in the internal memory can be normally transferred to and stored in the external memory. However, in the case where data quantity of the performance data stored in the internal memory is larger than a storage capacity of the external memory, the performance data stored in the internal memory are controlled to be inhibited from being transferred to the external memory. In this case, an alarm may be generated in order to inform a player of data quantity of the performance data to be overflowed from the external memory when such performance data are to be stored in the external memory.

15 Claims, 11 Drawing Sheets

ELECTRONIC MUSICAL INSTRUMENT WHICH COMPARES AMOUNT OF DATA RECORDED IN INTERNAL MEMORY DEVICE WITH STORAGE CAPACITY OF EXTERNAL MEMORY DEVICE AND SELECTIVELY TRANSFERS DATA THERETO

BACKGROUND OF THE INVENTION

1. Field of the Invention

The present invention relates to an electronic musical instrument, and more particularly to an electronic musical instrument which can store key operation data corresponding to a musical performance played by using a keyboard and which can also transfer the stored key operation data to an external memory.

2. Prior Art

Conventionally, a recent electronic technology develops an electronic musical instrument which can store performance data corresponding to a keyboard performance in an internal memory so that an automatic performance will be played by use of the stored performance data. Such electronic musical instrument can transfer the performance data stored in the internal memory to an external memory as disclosed in an automatic performance apparatus of Japanese Patent Laid-Open No. 59-139093.

If a storage capacity of the external memory is set smaller than a quantity of the performance data stored in the internal memory (hereinafter, simply referred to as "an internal data quantity") in the conventional electronic musical instrument capable of executing a data transfer to the external memory, the stored performance data are inhibited from being transferred to the external memory, i.e., the data transfer is not executed at all. In this case, the conventional electronic musical instrument wastes the whole musical performance which is played in order to transfer the performance data to the external memory.

In the above-mentioned case, by lighting up a light emitting diode (LED) or by displaying a predetermined message on a liquid crystal display device or the like, a player can be informed that the data transfer is inhibited from being executed.

By using the above-mentioned LED or the liquid crystal display device, the player can know that the data transfer is inhibited from being executed, but the player can not know how much is the storage capacity of the external memory short of a desirable storage capacity. Therefore, it is impossible for the player to know how much the performance quantity (or the data quantity) can be transferred to the external memory. In other words, the conventional electronic musical instrument cannot give the player the information about how much of the performance quantity can be transferred to the external memory.

SUMMARY OF THE INVENTION

It is accordingly a primary object of the present invention to provide an electronic musical instrument which does not waste the whole musical performance for the external memory when the storage capacity of the external memory is smaller than the internal data quantity and which can transfer the minimum performance data within the allowable storage capacity of the external memory.

It is another object of the present invention to provide an electronic musical instrument which can inform the player of a data quantity of the performance data to be overflowed in the external memory when the storage capacity of the external memory is smaller than the internal data quantity.

In a first aspect of the invention, there is provided an electronic musical instrument comprising: (a) input keys; (b) internal memory means; (c) writing control means for writing operation data corresponding to an operation of the input keys into the internal memory means; (d) musical tone signal generating means for generating a musical tone signal corresponding to the operation data; (e) external memory means which can be freely attached to and detached from a main body of the electronic musical instrument; and (f) transfer control means for comparing operation data quantity of the operation data stored in the internal memory means with a storage capacity of the external memory means when the operation data stored in the internal memory means are to be transferred to the external memory means, all of the operation data being transferred to the external memory means when the storage capacity is larger than the operation data quantity, a certain part of the operation data being transferred to the external memory means when the storage capacity is smaller than the operation data quantity.

In a second aspect of the invention, there is provided an electronic musical instrument comprising: (a) input keys; (b) internal memory means; (c) writing control means for writing operation data corresponding to an operation of the input keys into the internal memory means; (d) musical tone signal generating means for generating a musical tone signal corresponding to the operation data; (e) external memory means which can be freely attached to and detached from a main body of the electronic musical instrument; and (f) alarm means for comparing operation data quantity of the operation data stored in the internal memory means with a storage capacity of the external memory means when the operation data stored in the internal memory means are to be transferred to the external memory means, the alarm means informing a player of overflow data quantity of the operation data to be overflowed from the external memory means when the storage capacity is smaller than the operation data quantity.

In a third aspect of the invention, there is provided an automatic performance data recording and reproducing apparatus for an electronic musical instrument comprising: (a) first memory means for storing performance data; (b) second memory means for recording the performance data transferred from the first memory means; and (c) transfer means for transferring the performance data to the second memory means from the first memory means based on data quantity of the performance data and storage capacity of the second memory means in a recording mode, whereas the performance data are reproduced from the second memory means so that musical tones corresponding to the reproduced performance data are to be generated in a reproducing mode.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF THE PREFERRED EMBODIMENT

[I] Electric Constitution of an Embodiment of the Present Invention

Figure 1:
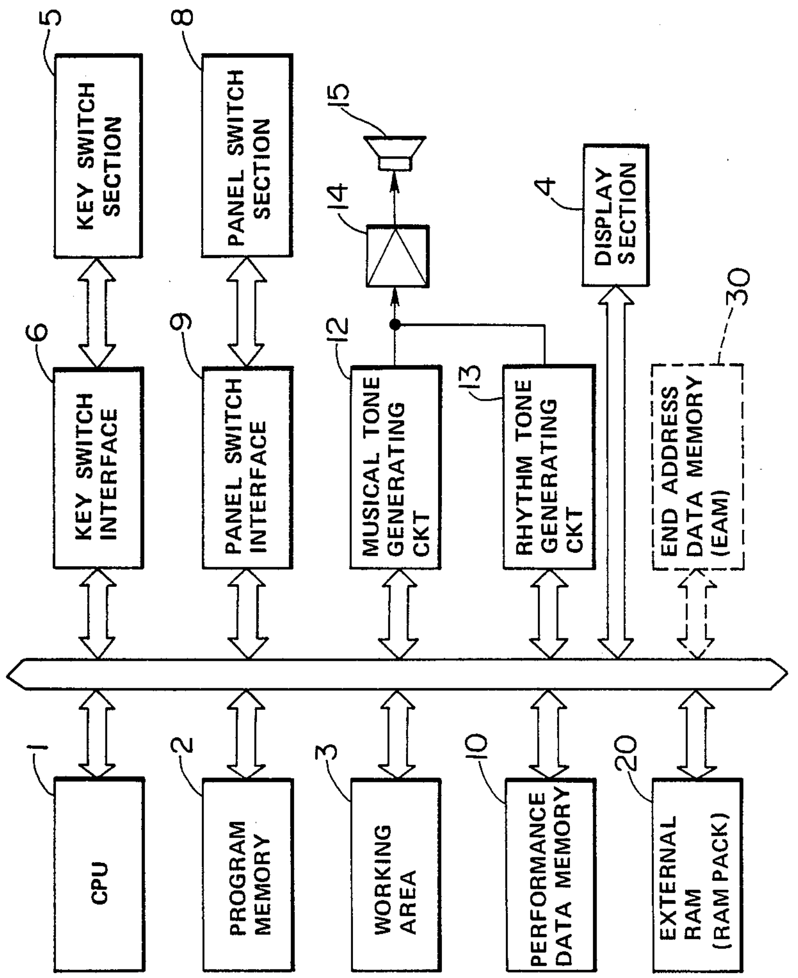
FIG. 1 is a block diagram showing an electric constitution of an embodiment of the present invention.

Referring now to the drawings, wherein like reference characters designate like or corresponding parts throughout the several views, FIG. 1 is a block diagram showing an electric constitution of an embodiment of the present invention. In FIG. 1, 1 designates a central processing unit (CPU) for controlling several sections of the electronic musical instrument shown in FIG. 1, and this CPU 1 operates based on programs stored in a program memory 2. In addition, 3 designates a working area capable of storing several kinds of data in accordance with the process of the CPU 1, and several registers will be set in this working area 3 as described later.

A key switch section 5 consists of upper keys UK, lower keys LK, pedal keys PK and solo keys SK. On/off data of each key within the key switch section 5 are supplied to the CPU 1 via a key switch interface 6. The solo keys SK are used in a solo performance. More specifically, each of the solo keys SK selectively enables one musical tone effective in accordance with a process of a later arrival priority or a maximum tone pitch priority. Normally, the solo keys SK are arranged on an upper stage position of the upper keys UK.

In FIG. 1, 4 designates a display section consisting of the liquid crystal display device and its drive circuit. This display section 4 displays several kinds of messages under the control of the CPU 1.

A panel switch section 8 consists of several switches provided on an operation panel (not shown), i.e., switches for selecting tone colors, tone effects and rhythms; switches for controlling the performance data and other switches. The on/off data (or the on/off information) of each switch within the panel switch section 8 are supplied to the CPU 1 via a panel switch interface 9.

Figure 2:
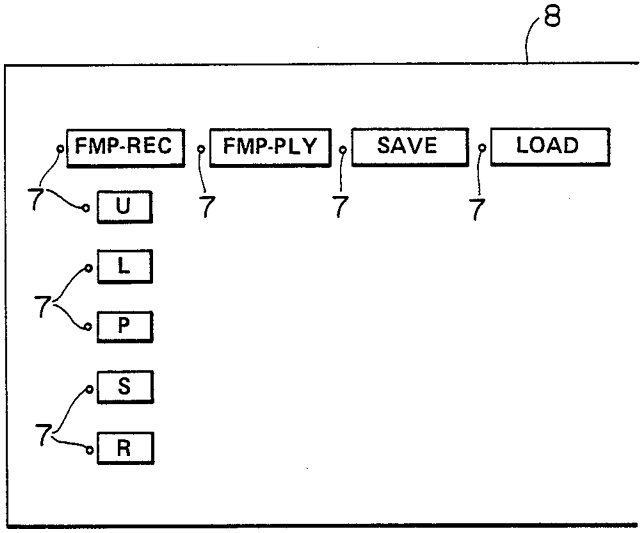
FIG. 2 is a front view showing a panel face of the embodiment of FIG. 1.

The switches shown in FIG. 2 are the above-mentioned switches for controlling the performance data in the panel switch section 8, and detailed description thereof will be given below.

(a) SWITCH FMP-REC

When the switch FMP-REC is depressed, the CPU 1 stores the performance data corresponding to the musical performance played by the player in a performance data memory 10. Such performance data consist of the tone pitch and on/off data of each key within the key switch section 5 and other on/off data (or registration data) of each of the tone color selecting switches and the rhythm selecting switches within the panel switch section 8. If a switch U is depressed while the switch FMP-REC is turned on, the performance data memory 10 is supplied with the performance data other than the on/off data of the upper keys UK. In other words, if the switch U is depressed while the switch FMP-REC is turned on, the on/off data of the upper keys UK are excluded from the performance data supplied to the performance data memory 10. Similarly, if each of a switch L, a switch P and a switch S is depressed, each on/off data of the lower keys LK, the pedal keys PK and the solo keys SK are excluded from the performance data respectively. Further, if a switch R is depressed, the registration data are excluded from the performance data. Thus, the player can select a data kind of the performance data to be stored in the performance data memory 10.

Figure 3:
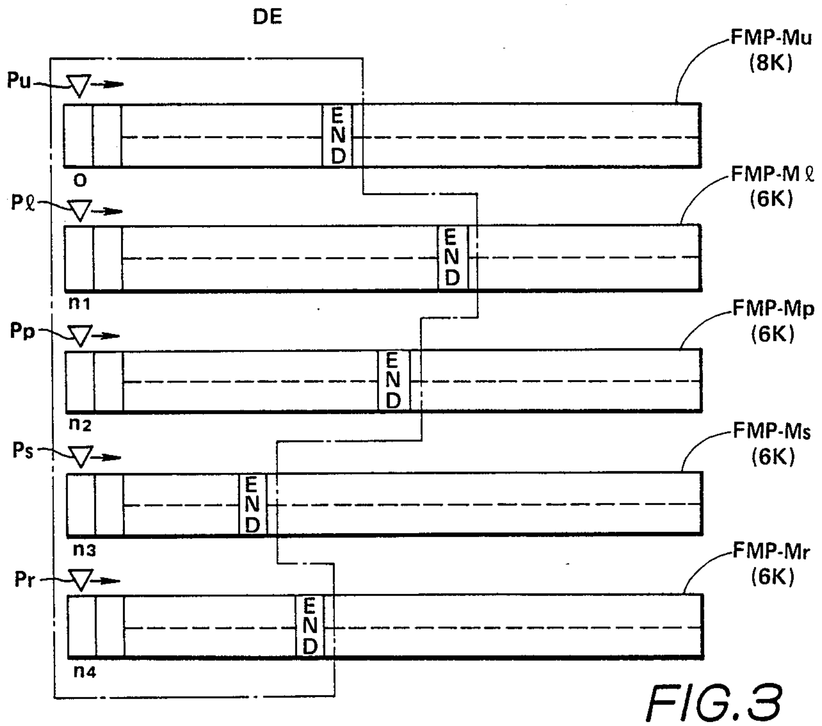
FIG. 3 shows a memory map of a performance data memory shown in FIG. 1.

FIG. 3 shows a data format (or a memory map) of the performance data memory 10. In FIG. 3, FMP-Mu designates an upper key area for storing key data of the upper keys UK. This key data can be defined as data composed of the tone pitch data and the on/off data. In addition, FMP-Ml designates a lower key area for storing key data of the lower keys LK, FMP-Mp designates a pedal key area for storing key data of the pedal keys PK, FMP-Ms designates a solo key area for storing key data of the solo keys SK, and FMP-Mr designates a registration data area for storing the registration data. In this case, the upper key area FMP-Mu has a storage capacity of 8 kilo-byte, and each of other areas has a storage capacity of 6 kilo-byte. Hence, the total storage capacity of the performance data memory 10 is 32 kilo-byte.

The CPU 1 allows the access to an address designated by each of pointers Pu, Pl, Pp, Ps and Pr in each of the upper key area FMP-Mu, the lower key area FMP-Ml, the pedal key area FMP-Mp, the solo key area FMP-Ms and the registration data area FMP-Mr. As shown in FIG. 3, the start addresses of these areas are designated by "0", "n1", "n2", "n3" and "n4" respectively.

(b) SWITCH FMP-PLY

The switch FMP-PLY is operated so as to execute the automatic performance based on the performance data stored in the performance data memory 10. When the switch FMP-PLY is depressed, the CPU 1 sequentially reads out the performance data from the performance data memory 10 so as to supply such read performance data to a musical tone generating circuit 12 and a rhythm tone generating circuit 13. The musical tone generating circuit 12 generates musical tones corresponding to the on/off data of each key (such as each of the upper keys UK, the lower keys LK etc.) and other on/off data of the tone color selecting switch and the like. On the other hand, the rhythm tone generating circuit 13 generates a rhythm accompaniment in accordance with a rhythm designated by a rhythm selecting switch and a tempo designated by a tempo designating volume and the like. The output signals of the musical tone generating circuit 12 and the rhythm tone generating circuit 13 are amplified by an amplifier 14 and then applied to a speaker 15.

(c) SWITCH SAVE

The switch SAVE is operated so as to transfer the performance data stored in the performance data memory 10 to an external RAM 20 (hereinafter, referred to as a RAM pack 20). When the switch SAVE is depressed, the CPU 1 executes a data transfer in according to the processes which will be described later. This RAM pack 20 can be freely attached to and detach from a main body of the electronic musical instrument, this RAM pack 20 consists of a non-volatile random access memory (RAM) using a back-up battery. The present embodiment can employ two kinds of RAM packs, i.e., the RAM packs of 8 kilo-byte and 32 kilo-byte.

(d) SWITCH LOAD

The switch LOAD is operated so as to write the performance data stored in the RAM pack 20 into the performance data memory 10. When the switch LOAD is depressed, the CPU 1 sequentially transfer the performance data stored in the RAM pack 20 to the performance data memory 10.

In addition, a LED 7 is arranged in the vicinity of each of the switches in the panel switch section 8 shown in FIG. 2. Each LED 7 is lighted up while each switch is turned on.

[II] Operations of an Embodiment of the Present Invention

Next, description will be given with respect to the operations of the present embodiment.

(A) SWITCH SCANNING PROCESS

Figure 4:
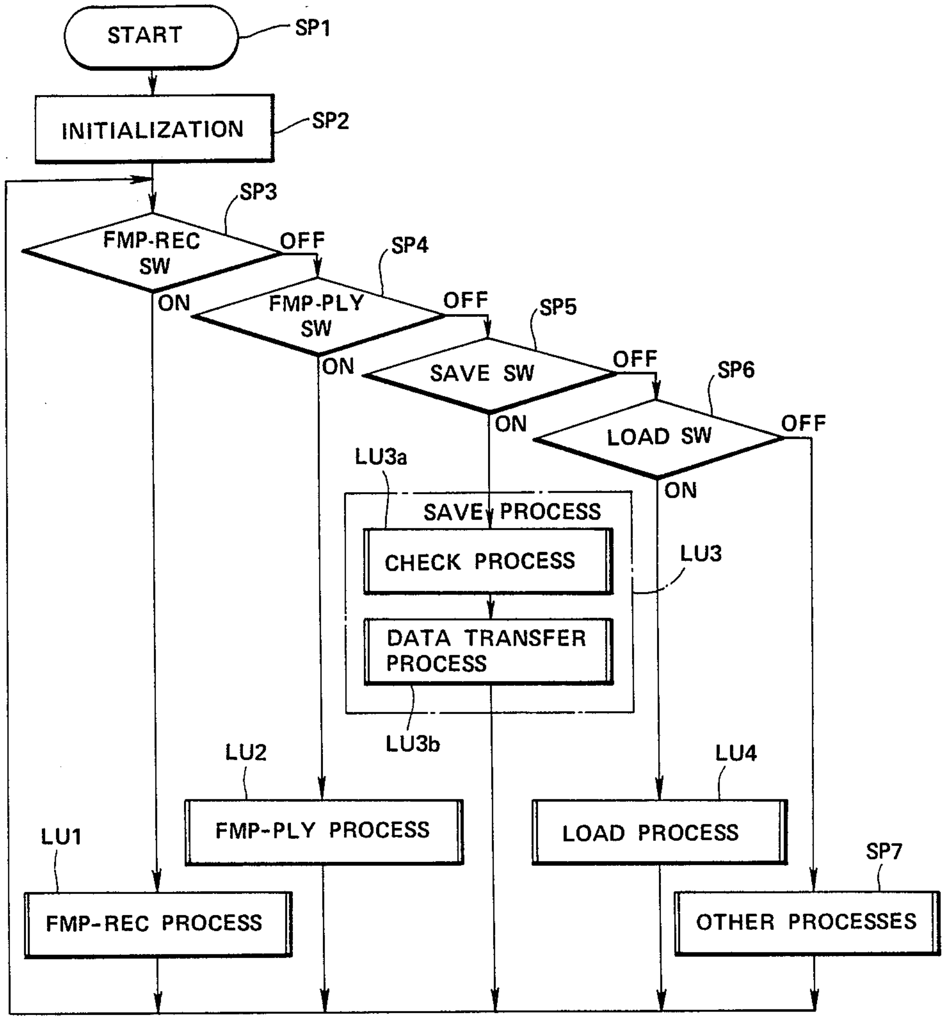
FIG. 4 is a flowchart showing a switch scanning process.

As shown in FIG. 4, the CPU 1 starts operation thereof in a step SP1, then the CPU 1 initializes the memories and registers in a step SP2. Subsequently, the CPU 1 checks whether the switching FMP-REC, FMP-PLY, FMP-SAVE and FMP-LOAD have been sequentially depressed or not in steps SP3 to SP6. In none of these switches have been depressed, other processes are executed in a step SP7, and the present process returns to the step SP3. Thereafter, processes in a loop consisting of the steps SP3 to SP7 are repeatedly executed until one of these switches is depressed.

Once the switch FMP-REC is depressed during an execution of the above loop, the CPU 1 lights up the LED 7 provided near the switch FMP-REC, and then the CPU 1 executes a FMP-REC process in a routine LU1 wherein the performance data corresponding to the performance actually played by the player are stored in the performance data memory 10.

Similarly, the CPU 1 lights up the LED 7 provided near each of the switches FMP-PLY, FMP-SAVE and FMP-LOAD when each of these switches is depressed. Thereafter, the CPU 1 executes each of a FMP-PLY process in a routine LU2, a SAVE process in a routine LU3 and a LOAD process in a routine LU4.

Next, detailed description will be given with respect to each of these routines LU1 to LU4.

(B) FMP-REC PROCESS ROUTINE LU1

According to timing data generated by a timer circuit (not shown) or a timer function for executing a software process, one musical bar is divided into n parts (where n denotes as an integral number) including a head part having a number "0" and a last part having a number "n−1". If the number n equals to "192", the timing data are generated based on the head part number "0" and the last part number "191".

When the key is depressed or released, a variation of the key operation is occurred. Hereinafter, such variation will be referred to as an "event". In this case, the timing data of the key are stored in the storing area thereof (such as the areas FMP-Mu, FMP-Ml and the like) when the above event is occurred on such key. Further, the value of the pointer is increased by one so that the key data of such key are written in the area thereof. For example, if the event is occurred in one of the upper keys UK, the timing data are written at address of the upper key area FMP-Mu designated by the pointer Pu. Subsequently, the value of the pointer Pu is increased by one, and the key data (consisting of the tone pitch data and the on/off data) are written at an address next to the above-mentioned address.

The above-mentioned process is executed on each of the keys and each registration data, and the performance data are stored in the performance data memory 10. As shown in FIG. 3, data END representative of the end of the performance data are added to the performance data stored in each storing area.

Incidentally, vertical lines each indicating the end of each part of the musical bar is stored as a part of the performance data.

(C) FMP-PLY PROCESS ROUTINE LU2

This routine LU2 is executed for reading out the performance data from the performance data memory 10 so as to generate the musical tones corresponding to the read performance data. The performance data are sequentially read out from the start address of each area within the performance data memory 10. More specifically, this routine LU2 is executed in the manner as described below.

First, the timing data are read from the address designated by each pointer (such as the pointers Pu, Pl, . . . ), and the read timing data are fetched to a timing register set in the working area 3. Next, the value of such pointer is increased by one, and the key data are read out and then fetched to a key data register set in the working area 3. At a time when the count value of the timer counter for counting a tempo clock coincides with the value of the timing data stored in the timing register, the key data are read from the key data register and then the read key data are supplied to the musical tone generating circuit 12 wherein the musical tone corresponding to the supplied key data is generated.

After the value of the pointer is increased by one, next timing data and key data are read out and then fetched to the timing register and the key data register respectively. Such key data are supplied to the musical tone generating circuit 12 at a time when the count value of the timer counter becomes equal to the value of the timing register. Thereafter, each pair of the timing data and the key data are read from the performance data memory 10 in the same manner as described above. At a time when the value of the timer counter becomes equal to the value of the timing register, a musical tone generating process is executed.

(D) SAVE PROCESS ROUTINE LU3

This SAVE process routine LU3 consists of a check process LU3*a* and a data transfer process LU3*b*. First, description will be given with respect to the check process LU3*a*.

(1) CHECK PROCESS ROUTINE LU3*a*

Figure 5:
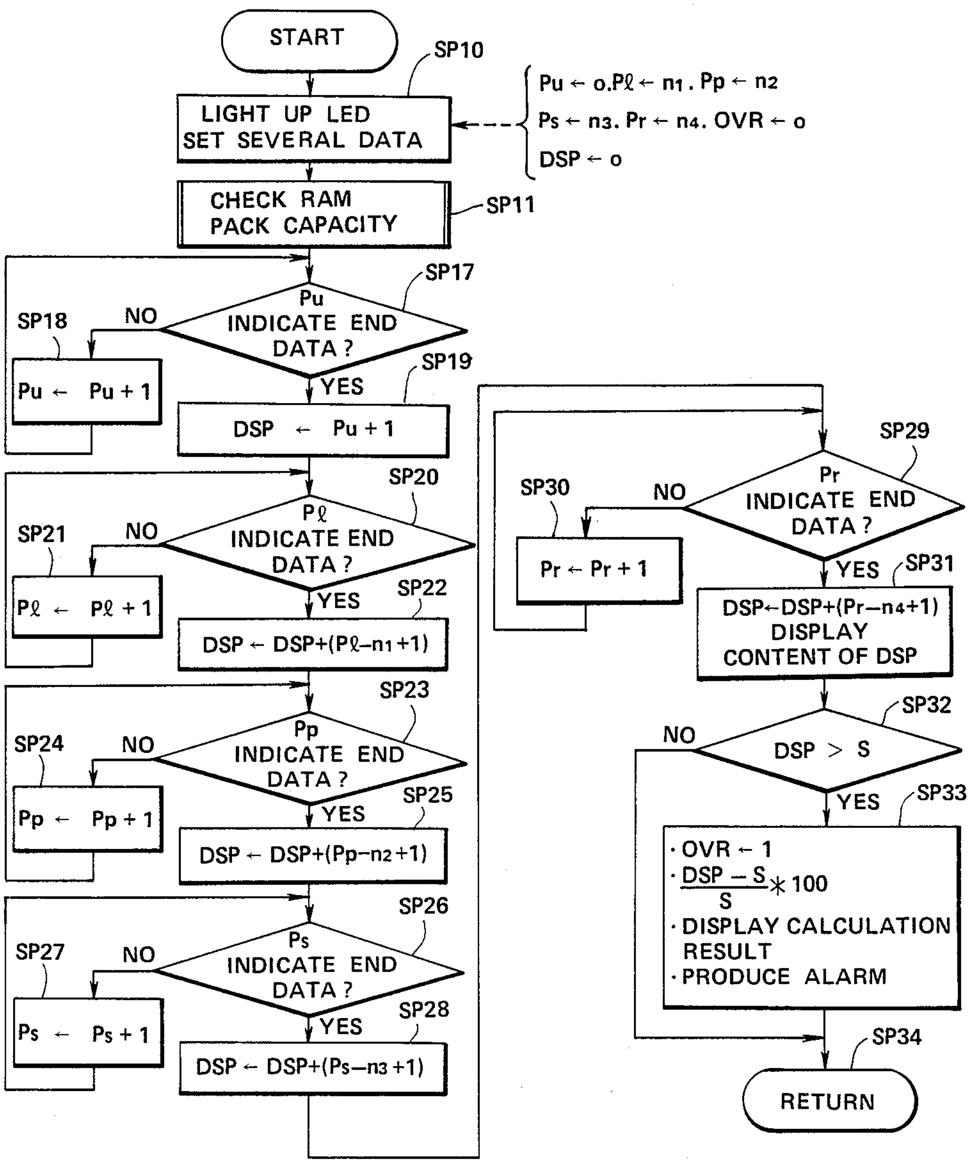
FIG. 5 is a flowchart showing a check processing routine.
Figure 6:
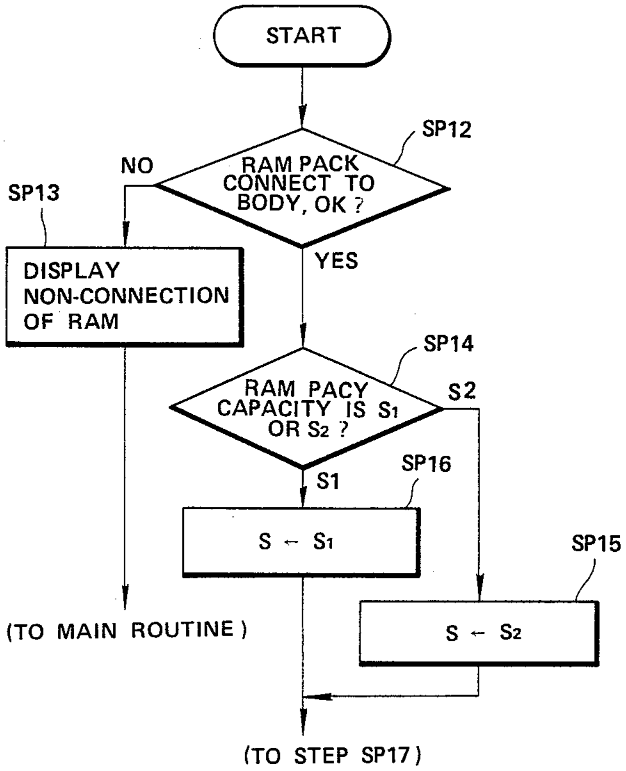
FIG. 6 is a flowchart showing a RAM pack capacity checking process.

FIG. 5 is a flowchart of the check process routine LU3*a*. When the switch SAVE is operated, the CPU 1 lights up the LED 7 near the switch SAVE. Thereafter, the CPU 1 initializes the pointers Pu, Pl, Pp, Ps and Pr respectively. In other words, the values "0", "n1", "n2", "n3" and "n4" are respectively set to the pointers Pu, Pl, Pp, Ps and Pr. In addition, the CPU 1 clears a register DSP and a flag OVER both set in the working area 3 in a step SP10. Next, the present process advances to a step SP11 wherein the CPU 1 checks the storage capacity of the RAM pack 20 connected to the main body. At a first stage of such capacity checking process shown in FIG. 6, the CPU 1 judges whether the RAM pack 20 is connected to the main body in a good manner or not in a step SP12. Such judgment is executed by examining the terminal voltage of the RAM pack 20. If an imperfect connection is occurred, the present process advances to a next step SP13 wherein the CPU 1 controls the display section 4 (shown in FIG. 1) so that a message representing the imperfect connection of the RAM pack 20 will be displayed. Thereafter, the present process returns to the switch scanning process shown in FIG. 4 again. On the other hand, if the RAM pack 20 is connected to the main body in a normal manner, the present process advances to a step SP14 wherein the CPU 1 discriminates whether the storage capacity of the RAM pack 20 is represented by S1 or S2. In the present embodiment, S1 is set equal to 8 kilo-bytes, and S2 is set equal to 32 kilo-bytes. Such storage capacity is discriminated by examining the voltage at a predetermined terminal of the RAM pack 20. If the storage capacity is identical to S2, the value S2 is stored in a register S in a step SP15. If the storage capacity is identical to S1, the present process advances to a step SP16 wherein the value S1 is stored in the register S. After the process in the step SP15 and SP16 is executed, the present process advances to a step SP17 of the check process shown in FIG. 5.

In the step SP17, the CPU 1 judges whether the data in the upper key area FMP-Mu designated by the pointer Pu are identical to the end data END or not. If such data are not identical to the end data END, the present process advances to a step SP18 wherein the value of the pointer Pu is increased by one, and then the process in the step SP17 is executed again. Thereafter, processes in a loop consisting of steps SP17 and SP18 are executed until the end data END are detected in the step SP17. When the end data END are detected in the step SP17, a value (Pu+1) is written into the register DSP in a step SP19. Since the start address of the upper key area FMP-Mu is represented by the value "0", the result of the step SP19 indicates the data quantity (or a number of bytes) of the data stored in the upper key area FMP-Mu (hereinafter, simply referred to as the data quantity of the upper key area FMP-Mu). In other words, when the process in the step SP19 is completely executed, a value representative of the data quantity of the upper key area FMP-Mu is written in the register DSP.

In steps SP20 and SP21, the value of the pointer Pl is increased by one until the data stored in the lower key area FMP-Ml designated by the pointer Pl becomes identical to the end data END in the processes of the steps SP17 and SP18. When the end data END are detected in the step SP20, the present process advances to a step SP22 wherein an operation represented by [DSP+(Pl−n1+1)] is performed and the result of such operation is written in the register DSP. As is clear from FIG. 3, the value (Pl−n1+1) indicates the data quantity of the data stored in the lower key area FMP-Ml (hereinafter, simply referred to as the data quantity of the lower key area FMP-Ml). Therefore, certain value is stored in the register DSP after the process in the step SP22 is executed, and such certain value indicates the sum of the two data quantity of the upper key area FMP-Mu and the lower key area FMP-Ml.

Next, in processes in a loop consisting of steps SP23 and SP24, the data quantity of the pedal key area FMP-Mp is detected in the manner similar to the data quantity of the upper key area FMP-Mu and the lower key area FMP-Ml. The detected data quantity of the pedal key area FMP-Mp is added to the value of the register DSP in a step SP25. In processes in a loop consisting of steps SP26 and SP27, the data quantity of the solo key area FMP-Ms is detected and the detected data quantity is further added to the value of the register DSP in a step SP28. In processes in a loop consisting of steps SP29 and SP30, the data quantity of the registration data area FMP-Mr is detected and the detected data quantity is added to the value of the register DSP in a step SP31. As a result, certain value must be stored in the register DSP after the process in the step SP31 is executed, and such certain value indicates the sum of all data quantity of the all areas. Such total sum can be visually shown by an area De in FIG. 3.

In a step SP31, the value of the register DSP, i.e., the sum of the performance data is displayed by the display section 4.

In a step SP32, the CPU 1 judges whether the value of the register DSP is larger than the vaue of the register S. At this time, either S1 (i.e., 8 kilo-bytes) and S2 (i.e., 32 kilo-bytes) has been assigned to the register S as a result for executing the processes in the steps SP15 and SP16. In addition, the value of the register DSP represents the data value of the performance data. If such value of the register DSP is larger than the value of the register S, the present process advances to a step SP33 wherein the following processes (a) to (d) are executed as described below.

(a) The value "1" is set to the flag OVER. In the case where the answer of the step SP32 is "YES", the performance data stored in the performance data memory 10 will be overflowed from the RAM pack 20 if such performance data are transferred to the RAM pack 20. Hence, the value "1" is set to the flag OVER for indicating such overflowing.

(b) An operation of [(DSP−S)/S]*100 is performed, and the result thereof is stored in the register DSP. Such operation result indicates the percentage of the overflow ratio of the overflowing data quantity against the storage capacity of the RAM pack 20.

(c) The display section 4 displays the above overflow ratio. This overflow ratio and the sum of the performance data are alternately displayed by an interval of one second. Incidentally, if the displaying space of the display section 4 is big enough, both of the overflow ratio and the sum of the performance data are displayed by the display section 4 simultaneously and statically.

(d) An alarm is produced. By this alarm, the player can know that it is impossible to save all of the performance data in the RAM pack 20.

After the above-mentioned processes are executed in the step SP33, the present process advances to the main routine via a step SP34, in other words, the present process advances to the data transfer process routine LU3*b*.

Meanwhile, if the answer of the step SP32 is "NO", the process in the step SP33 is skipped and then the present process advances to the data transfer process routine LU3*b* via the step SP34 from the step SP32, because the performance data are not overflowed from the RAM pack 20.

(2) DATA TRANSFER PROCESS ROUTINE LU3*b*

Next, description will be given with respect to the data transfer process routine LU3*b* in conjunction with FIGS. 7A and 7B.

Figure 7A:
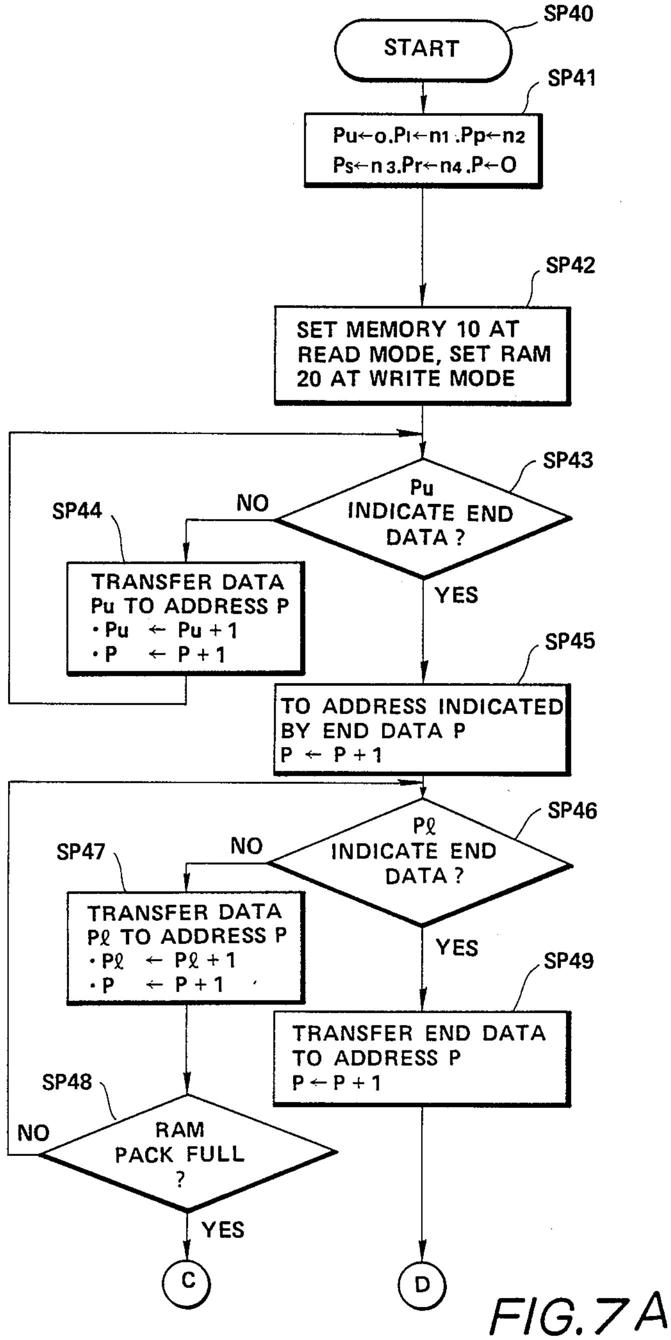
FIGS. 7A and 7B show a flowchart of a data transferring process.

In this data transfer process routine LU3*b*, the CPU 1 initializes the pointers Pu, Pl, Pp, Ps and Pr, and then the CPU 1 clears the pointer P set in the working area 3 for indicating a data transfer destination in steps SP40 and SP41 shown in FIG. 7A. In a next step SP42, the performance data memory 10 is set to a read mode, and the RAM pack 20 is set to a write mode. In a step SP34, the CPU 1 judges whether the data designated by the pointer Pu are identical to the end data END or not. If the answer of this step SP43 is "NO", the present process advances to a step SP44 wherein the data designated by the pointer Pu within the performance data memory 10 (i.e., the data stored in the upper key area FMP-Mu) are transferred to an address of the RAM pack 20 designated by the pointer P. After such data are transferred to the RAM pack 20, each of the values of the pointers Pu and P is increased by one, then the CPU 1 repeatedly executes the process in the step SP43 again. Thereafter, the processes in a loop consisting of the steps SP43 and SP44 are repeatedly executed until the answer of the step SP43 becomes "YES". By repeatedly executing the processes in the above loop, the RAM pack 20 is transferred with data having the address "0" to the data having an address just before the address of the end data END. When the answer of the step SP43 is turned to "YES", the present process advances to a step SP45 wherein the end data END are transferred to an address in the RAM pack 20 designated by the pointer P and then the value of the pointer P is increased by one. Thereafter, the present process advances to a next step SP46.

In the step SP46, the CPU 1 judges whether the data designated by the pointer Pl within the lower key area FMP-Ml are identical to the end data END or not. If the answer of this step SP46 is "NO", the present process advances to a step SP47 wherein the data designated by the pointer Pl are transferred to an address in the RAM pack 20 designated by the pointer P. After such data are transferred to the RAM pack 20, the values of the pointers Pl and P are increased by one, and then the present process advances to a step SP48 wherein the CPU 1 judges whether the RAM pack 20 becomes full or not. Such judgment is necessary because there is the possibility in that the RAM pack 20 becomes full in the middle of the data transfer of the data stored in the lower key area FMP-Ml if the RAM pack 20 has the storage capacity of 8 kilo-bytes.

Such judgement of the step SP48 is not executed when the data stored in the upper key area FMP-Mu are transferred. This is because the RAM pack 20 has the storage capacity of 8 kilo-bytes so that there is no possibility in that the RAM pack 20 becomes full. If the answer of the step SP48 is "NO", the process in the step SP46 is executed again. Thereafter, processes in a loop consisting of the steps SP46 to SP48 are repeatedly executed until the end data END are detected or the RAM pack 20 becomes full. While executing such loop, the data stored in the lower key area FMP-Ml are transferred to the RAM pack 20. If the RAM pack 20 becomes full during the execution of the above loop, the answer of the step SP48 (shown in FIG. 7A) becomes "YES", and an error message is displayed by the display section 4 in a step SP50 (shown in FIG. 7B). Then, the present process returns to the switch scanning process routine (i.e., the main routine) shown in FIG. 4. Thus, if the RAM pack 20 becomes full during the data transfer of the data stored in the lower key area FMP-Ml, the error message is displayed and the data transfer thereafter is inhibited from being executed.

Meanwhile, if the RAM pack 20 does not become full during the data transfer of the data stored in the lower key area FMP-Ml, the data transfer is continued until the end data END are detected in the step SP46, so that all of the data stored in the lower key area FMP-Ml are transferred to the RAM pack 20.

When the end data END are detected in the step SP46, the present process advanced to the step SP49 wherein the end data END are transferred to an address in the RAM pack 20 designated by the pointer P, and then the value of the pointer P is increased by one.

Figure 7B:
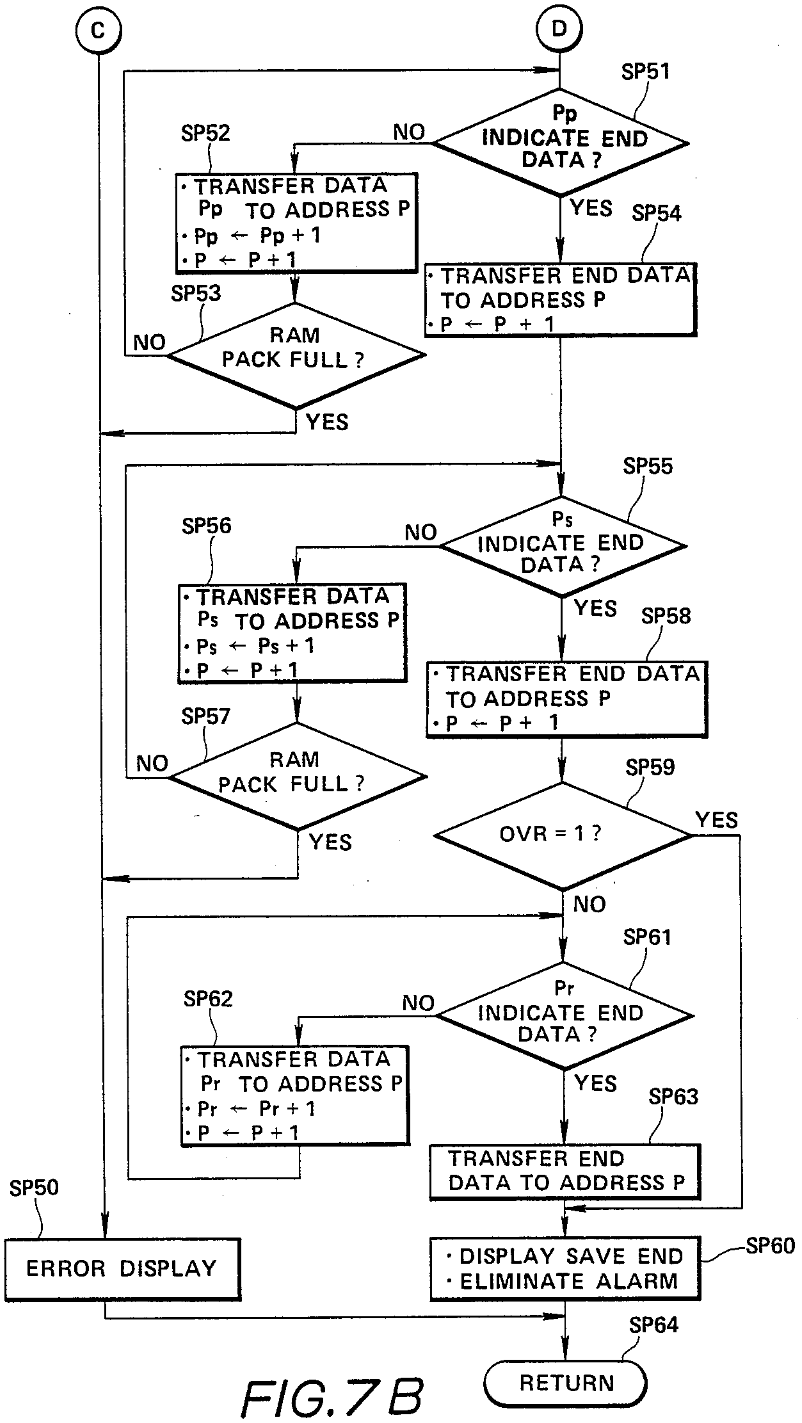

Next, similar to the data transfer of the lower key area FMP-Ml, the data stored in the pedal key area FMP-Mp are transferred to the RAM pack 20 by executing processes in a loop consisting of steps SP51 to SP53 (shown in FIG. 7B). Similarly, the data stored in the solo key area FMP-Ms are transferred to the RAM pack 20 by executing processes in a loop consisting of steps SP55 to SP57. In this case, if the RAM pack 20 becomes full during the data transfer of the above areas FMP-Mp and FMP-Ms, if the judgement answer of the step SP53 or SP57 becomes "YES", the error message is displayed, and then the present process returns to the main routine in the steps SP50 and SP64. The processes of the steps SP54 and SP58 are identical to the process of the step SP45.

After the data transfers of the above-mentioned areas are completed, the present process advances to a step SP59 wherein the CPU 1 judges whether the value of the flag OVER equals to "1" or not. If the answer of this step SP59 is "YES", a SAVE end message is displayed by the display section 4, the alarm generation is stopped, and then the present process returns to the main routine in the step SP64. In other words, if the value of the flag OVER equals to "1", the RAM pack 20 will become full and the data overflow is occurred during the data transfer of the registration data. Therefore, the present process returns to the main routine without transferring the registration data.

On the other hand, if the value of the flag OVER equals to "0", the data stored in the registration data area FMP-Mr are transferred to the RAM pack 20 by executing processes in a loop consisting of steps SP61 and SP62. When the end data END are detected in the step SP61, a process in a step SP63 is executed so that the end data END are transferred to an address in the RAM pack 20 designated by the pointer P. Thereafter, the SAVE end message is displayed in the step SP60, and the present process returns to the main routine.

In such SAVE process, if the CPU 1 judges that the storage capacity of the RAM pack 20 is not large enough to store the registration data which are lastly transferred thereto, other data are transferred and then the SAVE process is completed. Since the registration data are associated with the tone colors of the musical tones, this SAVE process enables the key data to be transferred to the RAM pack 20 so that the automatic musical performance can be executed based on the data stored in the RAM pack 20.

If the data other than the registration data can not be transferred to the RAM pack 20, the error message is displayed so as to inform the player of the inability of the data transfer. By looking at this error message and the overflow ratio displayed in the step SP33, the player can replay the musical performance the data quantity of which will be reduced. The performance data of such replayed musical performance can be stored in the performance data memory 10 and then saved in the RAM pack 20.

In the above-mentioned process, the reading of the performance data memory 10 is executed by every area, while the writing of the RAM pack 20 is executed from its start address.

(E) LOAD PROCESS ROUTINE LU4

Next, description will be given with respect to the LOAD process routine LU4. Since the performance data memory 10 has the storage capacity of 32 kilobytes (which is the same as or more than the data quantity of the data which can be stored in the RAM pack 20), the check process LU3*a* in the SAVE process is not necessary, and the execution of the LOAD process (i.e., the data fetching process) is started by examining the connection between the RAM pack 20 and the main body.

More specifically, in the LOAD process, the data are sequentially fetched to the upper key area FMP-Mu from the start address of the RAM pack 20. When the end data END are detected, the data stored in the RAM pack 20 are fetched to the lower key area FMP-Ml. Thereafter, at every time when the end data END are detected, the data fetching area is switched over, so that all of the performance data stored in the RAM pack 20 are transferred to the performance data memory 10.

[III] Operations of a First Modified Example of the Present Embodiment

Next, description will be given with respect to the operations of a first modified example of the present embodiment. The difference between this first modified example and the present invention is the operation of the check process routine LU3*a*, hence, description will be only given with respect to the check process LU3*a* of this first modified example in conjunction with FIG. 8.

Figure 8:
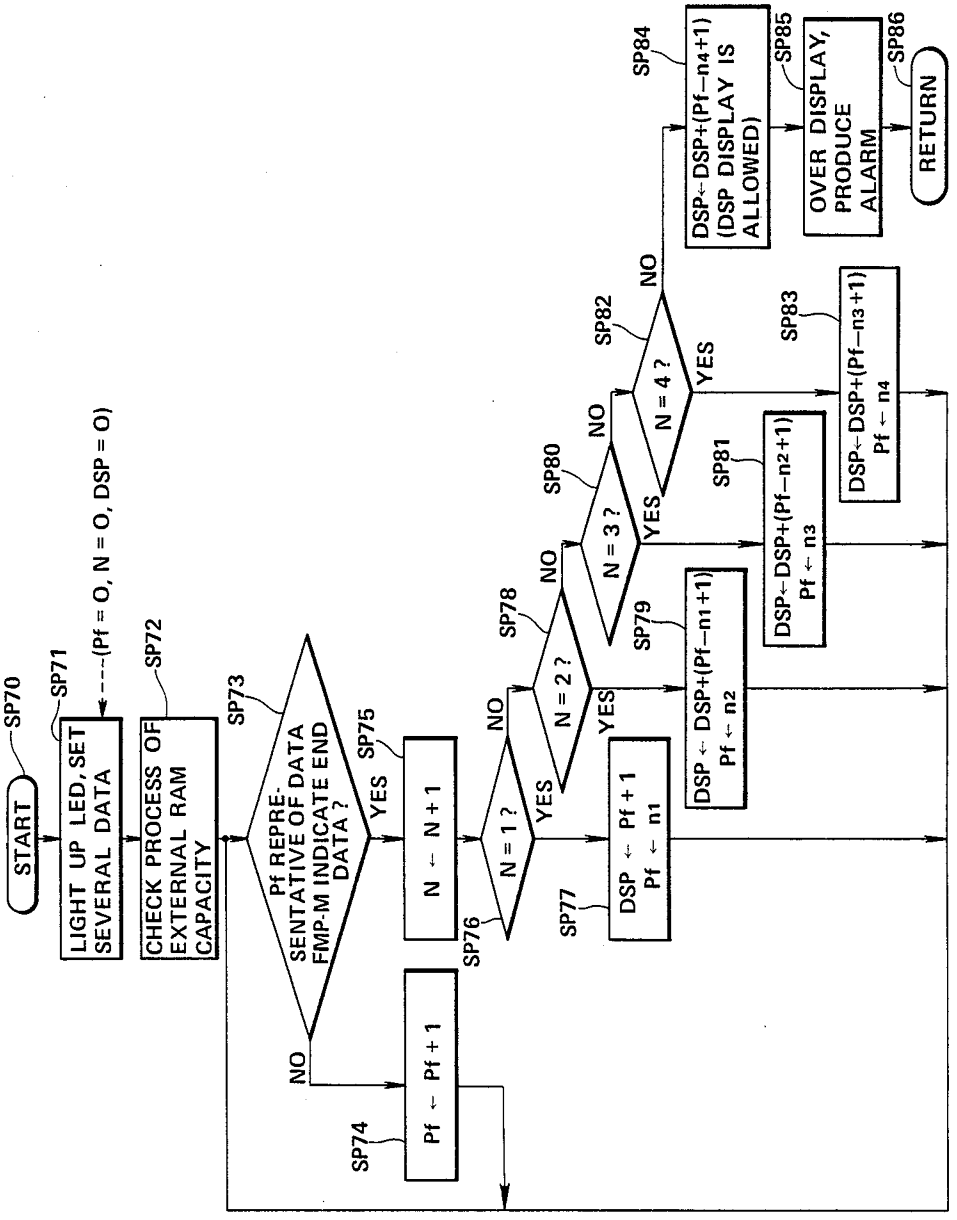
FIG. 8 is a flowchart showing another check processing routine employed in a first modified example of the present embodiment.

This check process is started in a step SP70 shown in FIG. 8, and then a pointer Pf and the registers N and DSP are all cleared in a step SP71. These pointer Pf and the register N are both set in the working area 3. This pointer Pf designates an address to which the access is allowed by the CPU 1.

In a step Sp 72, the CPU 1 checks the storage capacity of the RAM pack 20. This process of the step SP72 is exactly the same as that shown in FIG. 6. After such process is executed, the CPU 1 judges whether the pointer Pf designates the end data END or not in a step SP73. If the answer of this step SP73 is "NO", processes in a loop consisting of steps SP73 and SP74 are repeatedly executed by increasing the value of the pointer Pf by one until the answer of the step SP73 becomes "YES". In other words, by repeatedly executing the processes in such loop, the CPU 1 allows the access to the upper key area FMP-Mu from its start address "0". When the end data END are detected in the step SP73, the present process advances to a step SP75 wherein the value of the register N is increased by one so that the value of the register N will become equal to "1". In a next step SP76, the CPU 1 judges whether the value N equals to "1" or not. If the answer of this step SP76 becomes "YES", the present process advances to a step SP77 wherein an operation of (Pf+1) is executed and then the result of such operation is stored in the register DSP. In this case, the value of the register DSP corresponds to the address of the end data END stored in the upper key area FMP-Mu, hence, the operation result of (Pf+1) represents the data quantity of the upper key area FMP-Mu. In addition, the head address n1 of the lower key area FMP-Ml is saved in the pointer Pf in the step SP77. When the process of the step SP77 is completed, processes in a loop consisting of the steps SP73 an SP74 are repeatedly executed so that the CPU 1 can allow the access to the lower key area FMP-Ml from the head address n1. When the end data END are detected in the step SP75, the value of the register N is increased to "2". Via the steps SP76 and SP, the present process advances to a step SP79 wherein an operation of (DSP+Pf−n1+1) is performed to thereby calculate out the sum of the data quantity of the upper key area FMP-Mu and the data quantity of the lower key area FMP-Ml. The result of such operation is saved in the register DSP.

Thereafter, other data quantity of the remained areas is added to the value of the register DSP in steps SP81, SP83 and SP84. After the process of the step SP84 is completed, the register DSP stores the total data quantity (or the total number of bytes) of the performance data. Then, the present process advances to a step SP85 (the process of which is identical to the combined processes of the steps SP32 and SP33 shown in FIG. 5) wherein the overflow ratio is displayed and the writing of the flag OVER is executed.

As it is apparent from FIG. 8, the first modified example is advantageous in that there is no need to use the pointers other than the pointer Pf.

[IV] Operations of a Second Modified Example of the Present Embodiment

Next, description will be given with respect to operations of a second modified example of the present embodiment in conjunction with FIGS. 9 and 10.

Figure 10:
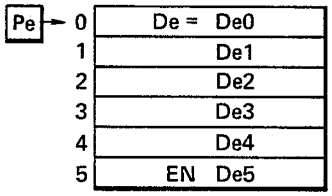
FIG. 10 shows a memory map of an end address data memory employed in the second modified example of the present embodiment.

In the FMP-REC process of this second modified example, when the end data END are written into each area shown in FIG. 3, the data quantity of each area is written in an end address data memory 30 as show in FIGS. 1 and 10. More specifically, values of (Pu+1), (Pl−n1+1), (Pp−n2+1), (Ps−n3+1) and (Pr−n4+1) are respectively written at addresses "0" to "4" of the end address data memory 30 as data De0, De1, De2, De3 and De4 as shown in FIG. 10. At an address "5" of the end address data memory 30, the end address data END are written.

Figure 9:
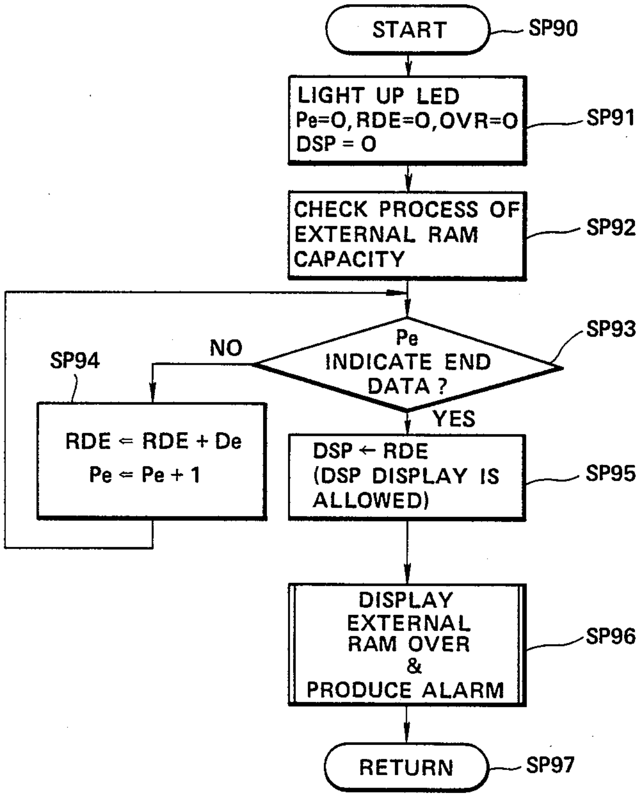
FIG. 9 is a flowchart showing still another check processing routine employed in a second modified example of the present embodiment.

As the check process routine LU3*a* of this second modified example, a process shown in FIG. 9 is executed.

After the check process shown in FIG. 9 is started in a step SP90, the CPU 1 lights up the predetermined LED, and the CPU 1 also clears a pointer Pe, a register RDE for storing the end address data, the display register DSP and a flag OVR in a step SP91. This pointer Pe designates an address of the end address data memory 30 to be given with the access as shown in FIG. 10. In a next step SP92, the CPU 1 checks the storage capacity of the RAM pack 20 as similar to the RAM pack capacity check process shown in FIG. 6. In a step SP93, the CPU 1 judges whether the pointer Pe designates the end data END or not. If the answer of this step SP93 is "NO", the present process advances to a step SP94 wherein the value of the data designated by the pointer Pe is added to the value of the register RDE and the value of the pointer Pe is increased by one. Then, the present process returns to the step SP93 again. Thereafter, the processes in a loop consisting of the steps SP93 and SP94 are repeatedly executed until the end data END are detected in the step SP93. By repeatedly executing the processes in such loop, the values of the data De0 to De4 are successively added to the value of the register RDE. When the end data END are detected in the step SP93, the present process advances to a step SP95 wherein the value of the register RDE is saved in the register DSP. In this case, the value saved in the register DSP in the step SP95 represents the total data quantity of the performance data memory 10. If necessary, the value of the register DSP can be displayed by the display section 4 in the step SP95. In a next step SP96, the CPU 1 executes the process identical to the processes in the steps SP32 and SP33 shown in FIG. 5, hence, description thereof will be omitted.

In this second modified example, the processes other than the check process shown in FIG. 9 are identical to those of the present embodiment as described before. As is apparent from the flowchart shown in FIG. 9, the check process of this second modified example can be executed at an extremely high speed.

In this second modified example, it is possible to omit the displaying of the contents of the register DSP from the process in the step SP95.

[V] Operations of a Third Modified Example of the Present Embodiment

Next, description will be given with respect to operations of a third modified example of the present embodiment in conjunction with FIGS. 11 to 12B.

Figure 11:
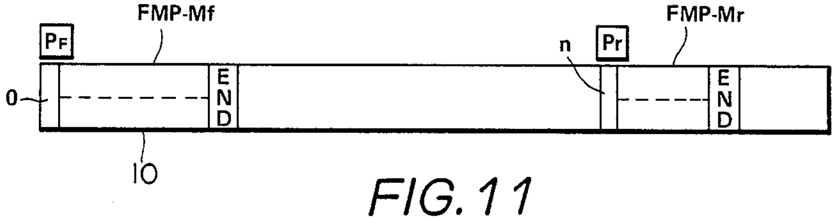
FIG. 11 shows another memory map of the performance data memory employed in a third modified example of the present embodiment.

In this third modified example, the performance data memory 10 has a memory map shown in FIG. 11 which is different from that shown in FIG. 3. In this memory map shown in FIG. 11, an area FMP-Mf is used to store the key data from a head address "0" thereof. An area FMP-Mr is an area which stores the registration data from a head address "n".

In this third modified example, the process FMP-REC is executed in a manner as described below. When a key event occurs, the timing of such key event is written in the key data area FMP-Mf. Subsequently, a value of a pointer $P_F$ is increased by one. Then, part data, on/off data and tone pitch data (of one byte in total) are respectively written in the performance data memory 10. In this case, the above part data indicate the part to which the keys (such as the upper keys UK, the lower keys LK, . . . ) belong. This writing is executed at every time when the key event occurs. Similar to the key data, the registration data are also written in the performance data memory 10.

Next, description will be given with respect to the SAVE process by referring to the flowchart shown in FIGS. 12A and 12B.

Figure 12A:
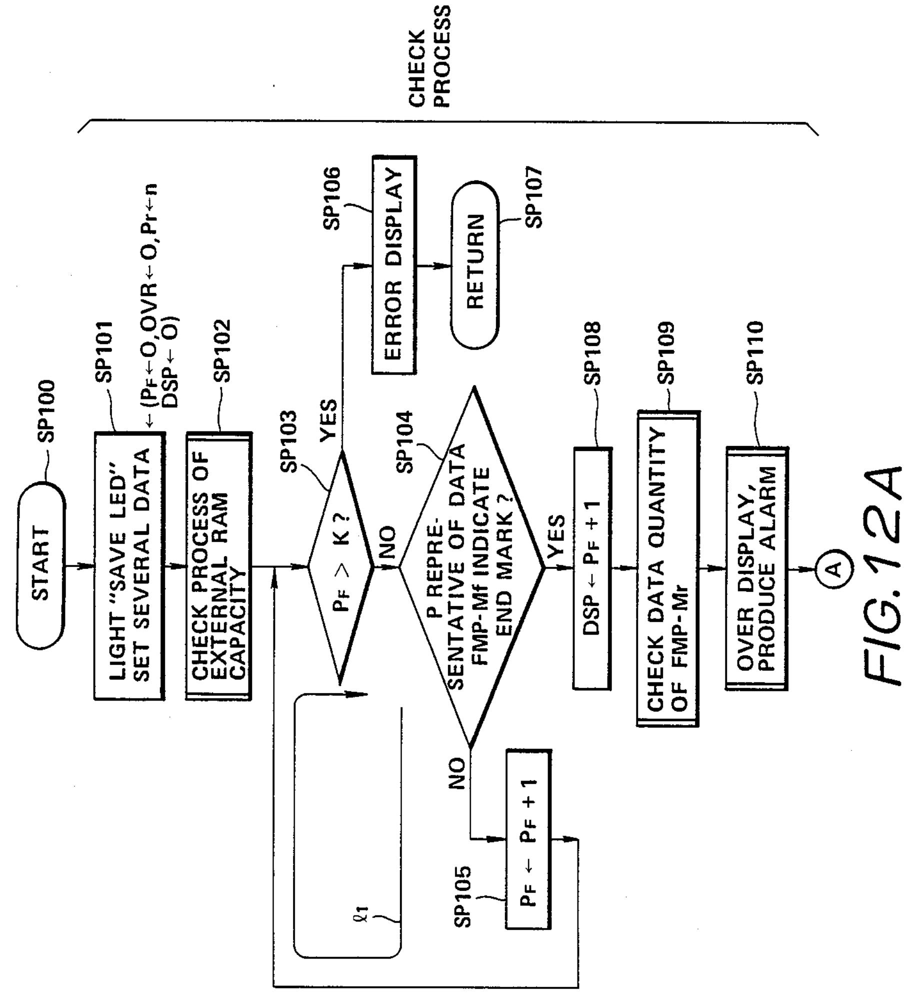
FIGS. 12A and 12B show a flowchart of a save process employed in the third modified example of the present embodiment.
Figure 12B:
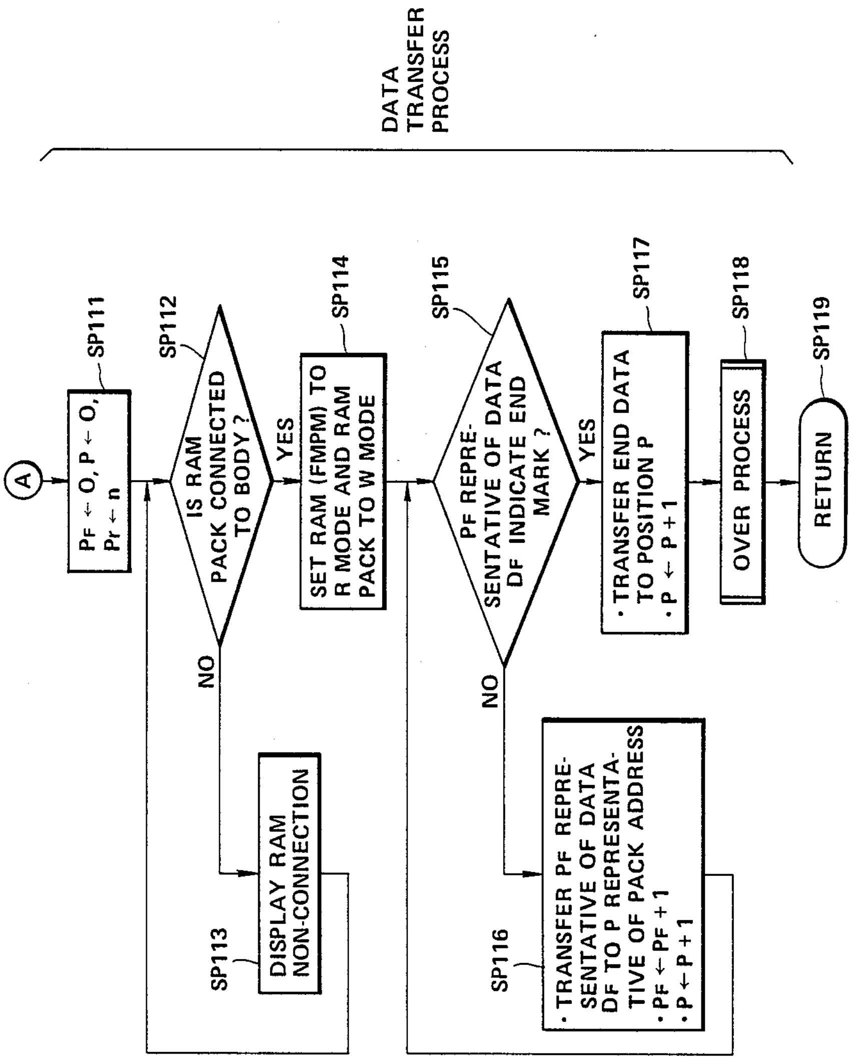

After the SAVE process is started in a step SP100 shown in FIG. 12A, the CPU 1 lights up the predetermined LED, and the CPU 1 also clear the pointer $P_F$, the flag OVR and the register DSP, and the CPU 1 further sets the value "n" to a pointer Pr in a step SP101. Thereafter, the CPU 1 checks the storage capacity of the RAM pack 20 in a step SP102. Then, the CPU 1 judges whether the value of the pointer $P_F$ is larger than a value K or not in a step SP103. As the value S used in such judgement, the storage capacity of the RAM pack 20 has been already set. If the answer of the step SP103 is "NO", the present process advances to a step SP104 wherein the CPU 1 judges whether the pointer $P_F$ designates the end data END or not. If the answer of this step SP104 is "NO", the value of the pointer $P_F$ is increased by one in a step SP105, and then the present process returns to the step SP103. Thereafter, processes in a loop l1 are repeatedly executed until the answer in the step SP103 or SP104 becomes "YES". When the answer in the step SP103 becomes "YES" during the execution of the loop l1, the error message is displayed in a step SP106, and then the present process returns to the main routine in a step SP107. In this case, the process of the step SP103 is executed in order that the CPU 1 judges whether the data quantity of the key data area FMP-Mf exceeds over the storage capacity of the RAM pack 20 or not. SO, if the data quantity exceeds over the storage capacity, the display section 4 displays an error message representative of the inability of the data transfer of the performance data.

When the answer of the step SP104 becomes "YES" while the processes in the loop 11 are repeatedly executed, an operation of $(P_F+1)$ is executed, and the result of such operation is saved in the register DSP in a step SP108. In other words, the data quantity of the key data area FMP-Mf is saved in the register DSP in the step SP108. In a next step SP109, the data quantity of the registration data area FMP-Mr is detected by executing the process similar to the processes in the steps SP104, SP105 and SP108. In a step SP110, the process similar to the processes in the steps SP32 and SP33 (shown in FIG. 5) is executed. In a next step SP111 shown in FIG. 12B, the CPU 1 clears the pointers $P_F$ and P, and the value "n" is set to the pointer Pr. After the CPU 1 checks the connection of the RAM pack 20 in steps SP112 and SP113, the performance data memory is set to the read mode, and the RAM pack 20 is set to the write mode in a step SP114. Thereafter, the key data stored in the key data area FMP-Mf are sequentially transferred to the RAM pack 20 by executing the processes in a loop consisting of steps SP115 and SP116. At this time, the writing of the RAM pack 20 is started from its head address. When the end data END are detected in the step SP115, the end data END are transferred to an address in the RAM pack 20 designated by the pointer P, and then the value of the pointer P is increased by one in a step SP117. In a next step SP118, the process similar to the processes in the steps SP59 to SP63 (shown in FIG. 7) is executed. Then, the present process returns to the main routine in a step SP119.

As described heretofore, the SAVE process of this third modified example is executed. In this case, the processes in the steps SP100 to SP110 shown in FIG. 12A correspond to the check process LU3*a*, and the processes in the steps SP11 to SP119 correspond to the data transfer process LU3*b*.

[VI] OTHER MODIFIED EXAMPLES

Next, description will be given with respect to other modified examples of the present embodiment.

(1) In each of the examples described heretofore, if one of the switches U, L, P, S or R is operated after the switch FMP-REC is operated, the storing of the part data corresponding to the operated switch is released.

However, the write mode of the performance data memory 10 can be enabled by operating the switch FMP-REC, and partial data corresponding to the operated switch can be sequentially added to the performance data stored in the memory 10 at every time when one of the switches U, L, P, . . . is operated.

(2) If the RAM pack has an insufficient storage capacity, data are transferred to the RAM pack 20 based on the predetermined priority. Based on such predetermined priority, the RAM pack 20 is transferred with the key data except the registration data are transferred to the RAM pack 20. However, it is possible to arbitrary change such priority. For example, it is possible to transfer one, two or three of the upper key data, the lower key data, the pedal key data and the solo key data based on a priority.

(3) In the examples described heretofore, the data transfer is executed on the automatic performance data. However, the data transfer is not limited to that, and it is possible to construct a system which transfers the tone color data (or tone color parameters) of the musical instrument. More specifically, it is possible to divide the plural data each representing each tone color of the upper keys, the lower keys, the pedal keys, the solo keys and the rhythm source into several data groups. In this case, one of the data groups is transferred based on the priority, and the remained data groups are ignored. Such system is suitable for a RAM pack having a small storage capacity.

(4) When the divided data groups are transferred to the RAM pack (i.e., when some of the upper key data, the lower key data, the pedal key data and the like are transferred to the RAM pack), it is possible to detect the maximum number of the data groups whose data can be transferred based on the address of the end data END of each data group. Such detection process can be realized with ease, hence, detailed description thereof will be omitted. When executing such detection process, it is possible to execute the data transfer in response to the storage capacity with remarkably high efficiency.

(5) Further, as the method of such data dividing process, it is possible to divide the data into performance data of a first musical tune, performance data of a second musical tune, and the like. In short, it is possible to divide the data by every musical tune. In this case, it is possible to transfer the performance data corresponding to the number of the musical tunes which can be transferred to the RAM pack.

(6) Similar to the above-mentioned example (5), it is possible to divide the performance data by every musical movement.

(7) In the examples described heretofore, the value of the overflow ratio is displayed by the percentage. Instead, it is possible to provide indicators such as multicolor light emitting diodes in the display section 4 so that the overflow ratio can be displayed by use of the color lights. For example, the display section 4 can light up a yellow color LED when the overflow ratio is 100%, a red color LED when the overflow ratio is 200%, and a green color LED when the overflow ratio is smaller than 100%. In addition, it is possible to change the color of the indicator which can be continuously changed. In this case, the color of such indicator becomes a middle color between the yellow color and the red color when the overflow ratio is 130%, for example.

(8) When the overflow is detected, the alarm is produced as described before. In this case, it is possible to change the tone scale of such alarm in response to the overflow ratio. In other words, it is possible to change the tone pitch of the alarm in response to the overflow ratio. For example, only a tone $C_3$ is produced when the overflow ratio indicates 12% over, and only a tone $D_3$ or the tones $C_3$ and $D_3$ are continuously produced when the overflow ratio indicates 24% over. In such case, it is possible to inform the overflow ratio between 0% and 100% over by use of one octave between tones $C_3$ and $C_4$, and it is also possible to inform the overflow ratio between 100% and 200% over by use of one octave between tones $C_4$ and $C_5$. Further, it is possible to change the tone mixing of the alarm in response to the overflow ratio. For example, the tone $C_3$ is produced when the overflow ratio is 12% over, and a mixed tone of tones $C_3$ and $E_3$ is produced when the overflow ratio is 24% over. In this case, as a alarm producing means, it is possible to independently provide an alarm producing circuit or it is possible to employ the musical tone generating circuit 12.

Above is the description of the preferred embodiment of the present invention. As described heretofore, this invention may be practiced or embodied in still other ways without departing from the spirit or essential character thereof. Therefore, the preferred embodiment and the modified examples thereof described herein are illustrative and not restrictive, the scope of the invention being indicated by the appended claims and all variations which come within the meaning of the claims are intended to be embraced therein.

What is claimed is:

1. An electronic musical instrument comprising:

(a) input keys;

(b) internal memory means;

(c) writing control means for writing operation data corresponding to an operation of said input keys into said internal memory means;

(d) musical tone signal generating means for generating a musical tone signal corresponding to said operation data;

(e) external memory means which can be freely attached to and detached from a main body of said electronic musical instrument; and (f) transfer control means for comparing an operation data quantity of said operation data stored in said internal memory means with the storage capacity of said external memory means prior to transfer when said operation data stored in said internal memory means are to be transferred to said external memory means, all of said operation data being transferred to said external memory means when said storage capacity is larger than said operation data quantity, a certain part of said operation data being selectively transferred to said external memory means when said storage capacity is smaller than said operation data quantity.

2. An electronic musical instrument according to claim 1, wherein said input keys comprise keys provided in a keyboard and setting keys for setting attributes of a musical tone to be generated.

3. An electronic musical instrument according to claim 1, wherein said internal memory means pre-stores priority data representative of a predetermined priority order, said transfer control means transferring said certain part of said operation data with said priority data to said external memory means when said transfer control means judges that said priority data can be transferred to said external memory means, whereas said transfer control means inhibits said certain part of said operation data from being transferred to said external memory means when said transfer control means judges that said priority data can not be transferred to said external memory means.

4. An electronic musical instrument comprising:

(a) input keys;

(b) internal memory means;

(c) writing control means for writing operation data corresponding to an operation of said input keys into said internal memory means;

(d) musical tone signal generating means for generating a musical tone signal corresponding to said operation data;

(e) external memory means which can be freely attached to and detached from a main body of said electronic musical instrument; and (f) alarm means for comparing an operation data quantity of said operation data stored in said internal memory means with the storage capacity of said external memory means when said operation data stored in said internal memory means are to be transferred to said external memory means, said alarm means informing a player of overflow data quantity of said operation data to be overflowed from said external memory means when said storage capacity is smaller than said operation data quantity.

5. An electronic musical instrument according to claim 4, wherein said alarm means displays a value of a ratio of said overflow data quantity against said storage capacity of said external memory means.

6. An electronic musical instrument according to claim 5, wherein said value of the ratio is displayed by a percentage.

7. An electronic musical instrument according to claim 4, wherein said overflow data quantity is displayed by changing display colors, each display color corresponding to a level of said overflow data quantity.

8. An electronic musical instrument according to claim 4, wherein said alarm means comprises means for generating an alarm, the tone pitch of which is varied in response to said overflow data quantity.

9. An electronic musical instrument according to claim 4 wherein said alarm means comprises means for generating an alarm which comprises plural tones substantially simultaneously generated, the time during which said plural tones are substantially simultaneously generated varying in response to said overflow data quantity.

10. An electronic musical instrument according to claim 4, wherein said input keys consist of keys provided in a keyboard and setting keys for setting attributes of a musical tone to be generated.

11. An electronic musical instrument according to claim 4 wherein said alarm means comprises means for generating an alarm which comprises plural tones substantially simultaneously generated, the number of plural tones substantially simultaneously generated varying in response to said overflow data quantity.

12. An automatic performance data recording and reproducing apparatus for an electronic musical instrument comprising:

(a) first memory means for storing performance data;

(b) second memory means for recording performance data transferred from said first memory means; and (c) transfer means for transferring said performance data stored in said first memory means to said second memory means based on a computed data quantity of said performance data stored in said first memory means and a detected storage capacity of said second memory means in a recording mode, wherein said transferred performance data are reproduced from said second memory means so that musical tones corresponding to the reproduced performance data are generated in a reproducing mode.

13. An automatic performance data recording and reproducing apparatus according to claim 12 further comprising input keys for generating said performance data in accordance with a musical performance played by a player, said first memory means storing said performance data generated by said input keys when said player performs a musical tune.

14. An automatic performance data recording and reproducing apparatus according to claim 12, wherein said transfer means further includes a control key, said performance data stored in said first memory means being allowed to be transferred to said second memory means when said control key is operated.

15. An automatic performance data recording and reproducing apparatus according to claim 12 further comprising alarm means for producing an alarm or informing an overflow data quantity of said performance data to be overflowed from said second memory means when said storage capacity is smaller than said data quantity of said performance data stored in said first memory means.

* * * * *